US006672823B2

(12) United States Patent
Henning

(10) Patent No.: US 6,672,823 B2
(45) Date of Patent: Jan. 6, 2004

(54) FORK POSITIONER FOR FACILITATING REPLACEMENT OF FORKS ON LIFT TRUCKS

(75) Inventor: Jeffrey Henning, Springfield, OH (US)

(73) Assignee: Cascade Corporation, Fairview, OR (US)

(*) Notice: Subject to any disclaimer, the term of this patent is extended or adjusted under 35 U.S.C. 154(b) by 3 days.

(21) Appl. No.: 09/952,256

(22) Filed: Sep. 11, 2001

(65) Prior Publication Data

US 2003/0049116 A1 Mar. 13, 2003

(51) Int. Cl.[7] .................................................. B60P 1/50
(52) U.S. Cl. ........................................ 414/667; 414/671
(58) Field of Search ................................ 414/621, 667, 414/671

(56) References Cited

U.S. PATENT DOCUMENTS

| | | | | |
|---|---|---|---|---|
| 3,754,673 A | | 8/1973 | Barda et al. | |
| 3,851,779 A | * | 12/1974 | Crawford | 414/667 |
| 3,889,833 A | * | 6/1975 | Thomas | 414/607 |
| 4,125,199 A | * | 11/1978 | Abels et al. | 414/671 |
| 4,533,290 A | | 8/1985 | Hackauf | |
| 4,902,190 A | | 2/1990 | House | |
| 5,033,934 A | | 7/1991 | Emilio | |
| 5,096,363 A | | 3/1992 | Weinert et al. | |
| 5,336,039 A | | 8/1994 | House | |
| 5,746,564 A | * | 5/1998 | McPherson | 414/607 |

FOREIGN PATENT DOCUMENTS

| | | |
|---|---|---|
| JP | 53-61982 | 5/1978 |
| JP | 53-79673 | 7/1978 |
| JP | 54-120075 | 8/1979 |
| JP | 56-121095 | 9/1981 |
| JP | 56-140595 | 10/1981 |
| JP | 56-144098 | 10/1981 |
| JP | 59-172399 | 9/1984 |
| JP | 61-132397 | 8/1986 |

* cited by examiner

*Primary Examiner*—Eileen D. Lillis
*Assistant Examiner*—Charles A. Fox
(74) *Attorney, Agent, or Firm*—Chernoff, Vilhauer, McClung & Stenzel, LLP

(57) ABSTRACT

A fork positioner for a forklift truck has power-actuated yokes, each having a base from which a pair of transversely spaced legs depend, for engaging respective load lifting forks and adjusting their spacing transversely along a fork-supporting member. Each of the yokes is selectively movable between a fork-engaging position and a fork-disengaging position, the latter position permitting the fork to be lifted upwardly off of the fork-supporting member for easy replacement of the fork.

7 Claims, 4 Drawing Sheets

FORK POSITIONER FOR FACILITATING REPLACEMENT OF FORKS ON LIFT TRUCKS

BACKGROUND OF THE INVENTION

This invention relates to a fork positioner for adjusting the transverse spacing between load-lifting forks of a lift truck. More particularly, the invention is an improvement of a previous fork positioner disclosed in U.S. Pat. No. 4,902,190, which is hereby incorporated by reference.

It is a common occurrence for one or more of the load-lifting forks of a lift truck to require replacement for any of a number of reasons, such as damage to the fork or the need to change the type of fork. Normally, such replacement is relatively easy because standard forks with hook-type mounting hardware can simply be moved transversely along a fork-supporting member to a disengagement position and then lifted vertically off of the fork-supporting member to detach the fork therefrom. However the presence of a fork positioner usually hinders such easy detachment. For example, the downwardly depending U-shaped fork positioning yokes utilized in the aforementioned U.S. Pat. No. 4,902,190 prevent the fork from being lifted upwardly off of the fork-supporting member. Accordingly, each yoke must be disassembled and moved out of the way to enable the fork to be replaced.

BRIEF SUMMARY OF THE INVENTION

The present invention solves the foregoing problem by providing a fork positioner having multiple fork-engaging yokes, each having a base from which a pair of transversely-spaced legs depend to detachably engage a respective fork such that the base of the yoke is positioned above an upper portion of the respective fork, and the legs of the yoke depend downwardly along the transversely-opposite sides of the respective fork. A power actuator assembly selectively moves the yokes transversely, and thereby moves the forks along a transverse fork-supporting member to adjust their transverse spacing. Each of the yokes has a fork-engaging position preventing a respective fork from being lifted upwardly off of the fork-supporting member, and a fork-disengaging position permitting the fork to be lifted upwardly off of the fork-supporting member, each of the yokes being selectively movable between its fork-engaging position and its fork-disengaging position.

The foregoing and other objectives, features, and advantages of the invention will be more readily understood upon consideration of the following detailed description, taken in conjunction with the accompanying drawings.

DETAILED DESCRIPTION OF THE PREFERRED EMBODIMENT

Figure 1:
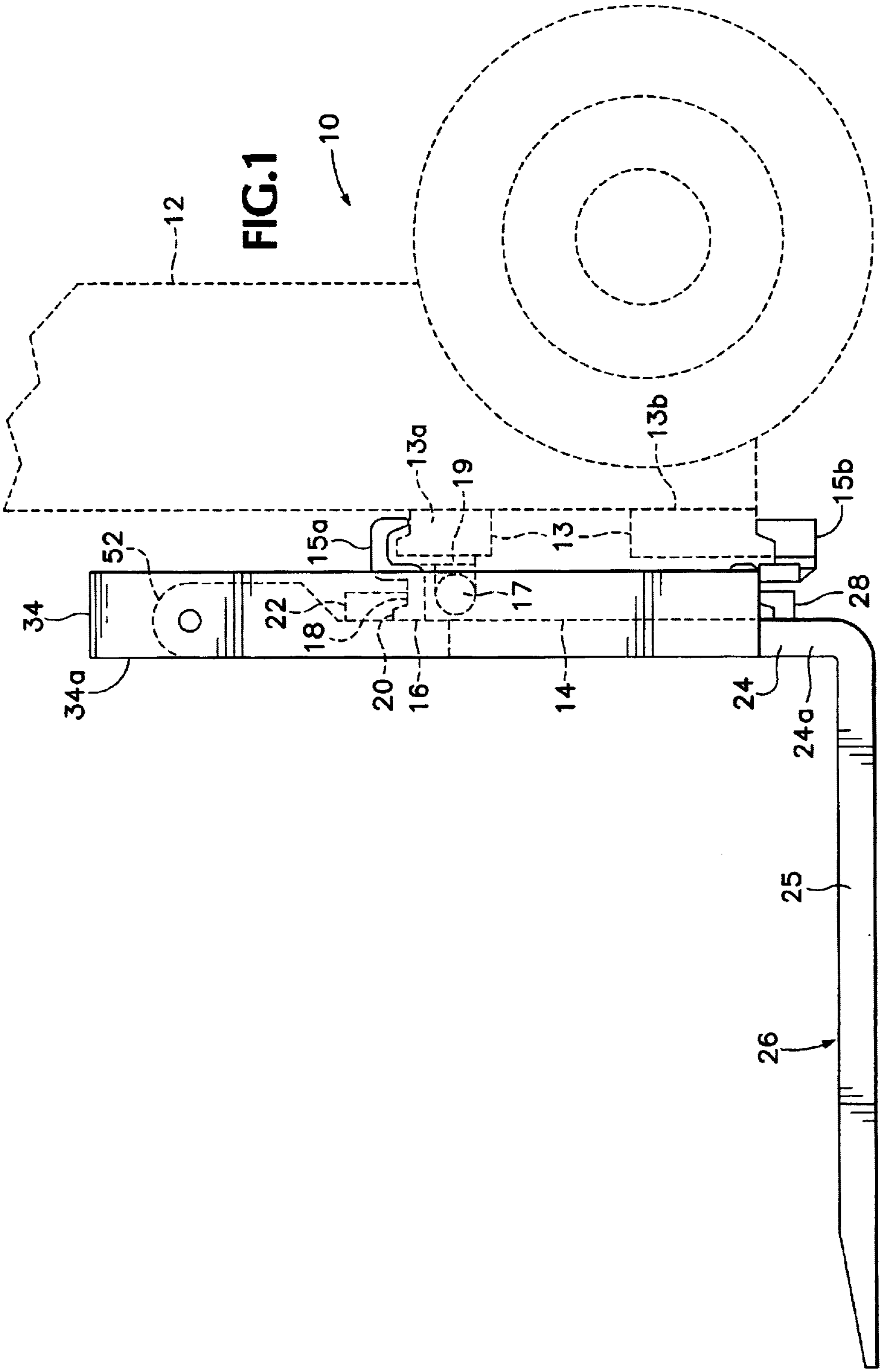
FIG. 1 is a side view of an exemplary embodiment of a fork positioner in accordance with the present invention, shown mounted on a side-shifting carriage in relation to a forklift truck indicated in phantom.
Figure 2:
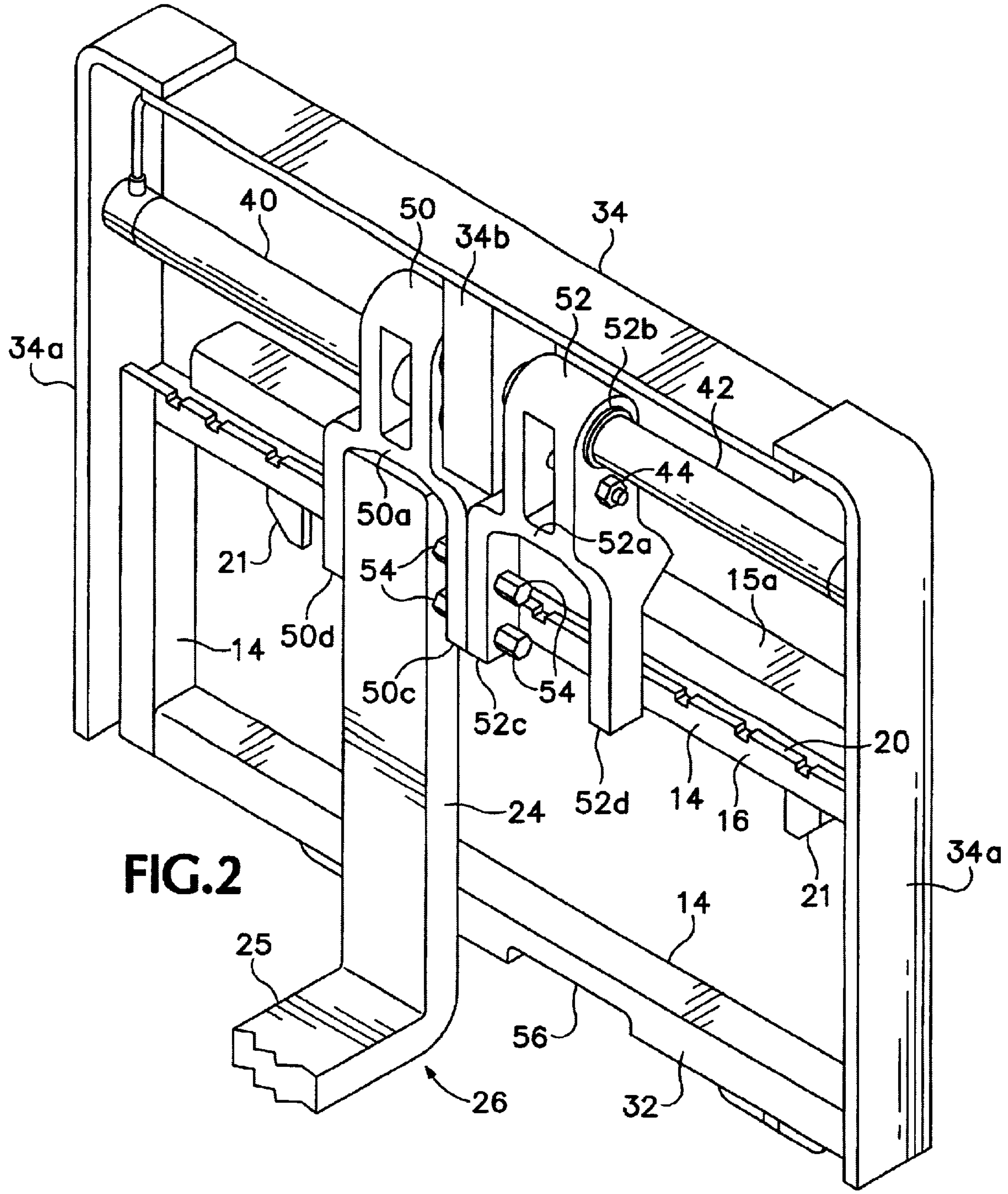
FIG. 2 is a perspective view of the fork positioner of FIG. 1, shown mounted on the side-shifting carriage.
Figure 4:
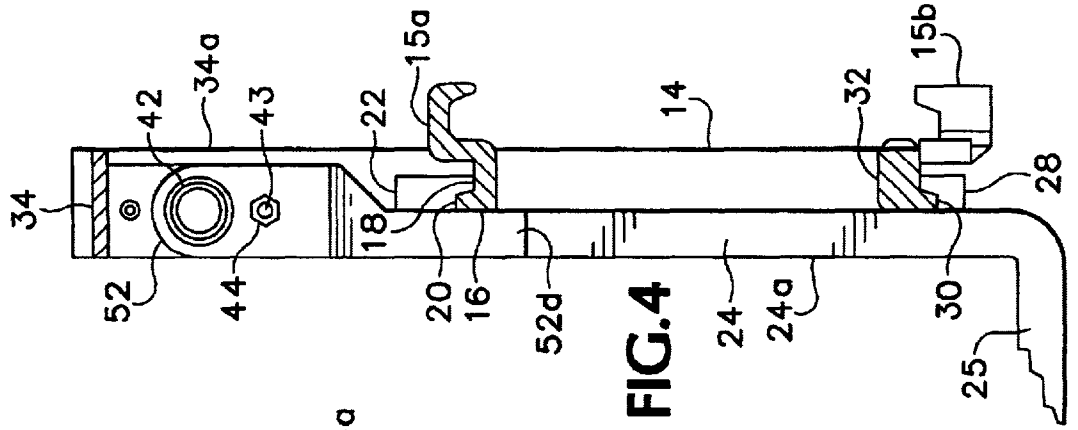
FIG. 4 is a cross section taken along line 4—4 of FIG. 3.
Figure 3:
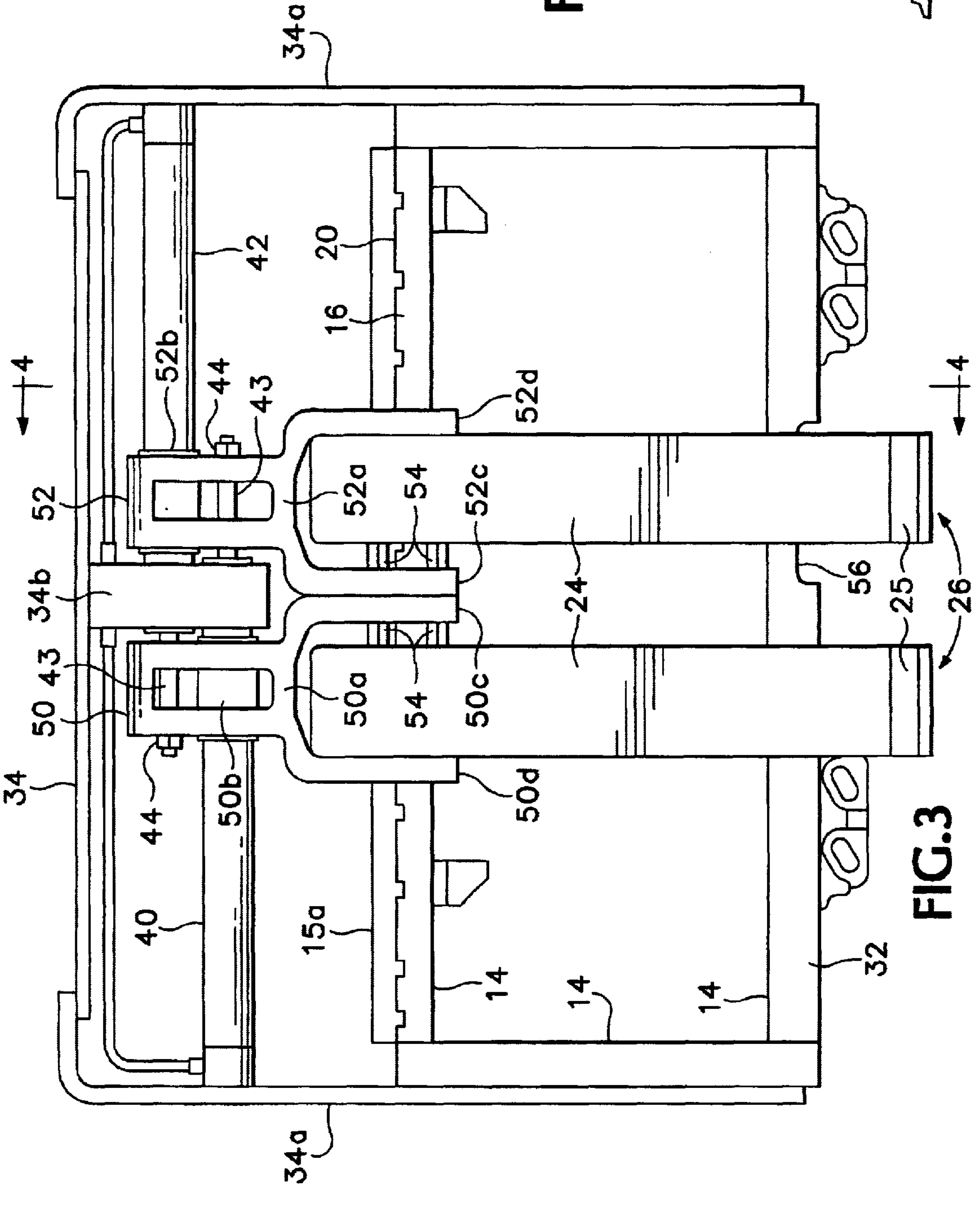
FIG. 3 is a front view of the fork positioner of FIG. 1, showing a pair of forks at minimum transverse spacing and the yokes in their fork engaging positions.

FIG. 1 shows the forward end of a typical counterbalanced lift truck 10 having a front axle 11 and a mast 12 upon which is mounted a vertically-reciprocating standard load carriage 13. Preferably, but not necessarily, a side-shifting carriage 14 is connected to the standard carriage 13 by upper and lower hooks 15*a* and 15*b* which slidably engage upper and lower fork-supporting members 13*a*, 13*b*, respectively, of the standard carriage 13. These hooks are slidable transversely relative to the carriage 13 by actuation of a double-acting side-shift hydraulic cylinder 17 interposed between a hook-type bracket 19 affixed to the carriage 13 and lugs 21 (FIG. 2) on the side-shifting carriage 14, utilizing a principle similar to that shown in U.S. Pat. No. 4,406,575 which is incorporated herein by reference. The side-shifting carriage 14 includes an elongate, transversely-extending upper fork-supporting member 16 having an upwardly-facing fork-supporting surface 18 adjacent to an upwardly-protruding lip 20. The surface 18 and lip 20 matingly engage downwardly-opening hooks such as 22 on the upstanding portions 24 of a pair of standard load-lifting forks 26 having forwardly-protruding load-lifting portions 25. The hooks 22, which normally are connectable to the upper fork-supporting member 13*a* of the standard carriage 13 in the absence of the side-shifting carriage 14, are slidable transversely along the fork-supporting surface 18 of the fork-supporting member 16. The forks 26 are further connected to the carriage 14 by means of upwardly-opening hooks 28 at the bottom of the upstanding portions 24 of the forks which slidably engage a downwardly-protruding lip 30 of a bottom fork-supporting member 32 on the carriage 14.

The fork positioner comprises a frame 34 which mounts to the side-shifting carriage 14 by means of side members 34*a* which abut the opposite transversely-facing ends of the carriage 14 and are fastened thereto by means of bolts (not shown) or, alternatively, by welding. As seen in FIG. 1, the frame 34 and its side members 34*a* overlap the upstanding portions 24 of the forks 26 in a rearward direction, but do not protrude forwardly beyond the forward extremities 24*a* of the upstanding portions 24 of the forks.

Alternatively, the side-shifting carriage 14 could be eliminated so that the hooks 22, 28 of the load-lifting forks 26 are instead slidably connected directly to the fork-supporting members 13*a* and 13*b* respectively of the standard load carriage 13, with the side members 34*a* of the fork positioner being fastened to the opposite transversely-facing ends of the fork-supporting members 13*a* and 13*b*.

The side members 34*a* of the frame 34, as well as an intermediate frame member 34*b*, support a pair of oppositely-facing double-acting hydraulic cylinders 40 and 42 whose piston rods 43 are detachably connected by threaded nuts 44 to respective yokes 50 and 52. The hydraulic cylinders 40 and 42 are connected in parallel to a source of pressurized fluid through a conventional flow divider (not shown) causing the two cylinders to extend and retract substantially equally in unison in response to a conventional operator-controlled valve (not shown). Each yoke 50 and 52 has a respective base 50*a*, 52*a*, each base containing a cylindrical bushing 50*b*, 52*b* which slides transversely and supportably along the exterior of one of the cylinders 40 and 42 in response to the extension and retraction of the cylinders 40 and 42. Depending from each base 50*a*, 52*a* is a pair of downwardly-protruding legs 50c, 50d and 52c, 52d, respectively. Each pair of legs extends downwardly alongside the respective opposite transverse sides of the upstanding portions 24 of a respective fork 26 in rearwardly-overlapping relationship thereto when the yokes are in fork-engaging positions as shown in all of the figures except FIG. 6. The base of each yoke, when in its fork-engaging position, extends over the top of each upstanding portion 24 of the forks in rearwardly-overlapping relationship thereto. Like the frame 34, the yokes in their fork-engaging positions do not extend forwardly of the forward extremities 24a of the upstanding portions 24 of the forks.

At least one depending leg of each yoke, such as 50c and 52c, has one or more adjusters, such as cap screws 54, so that the legs of the yokes can be adjusted to closely fit the opposite transverse sides of forks having different widths. Also, the legs of the yokes preferably extend downwardly sufficiently to engage the sides of the forks at locations below the fork-supporting surface 18 of the fork-supporting member 16. These features help to prevent the yokes from tilting the upstanding portions of the forks sideways, which would cause binding of the hooks 22 relative to the surface 18 and thereby impede sliding adjustment of the forks along the fork-supporting member 16.

Figure 6:
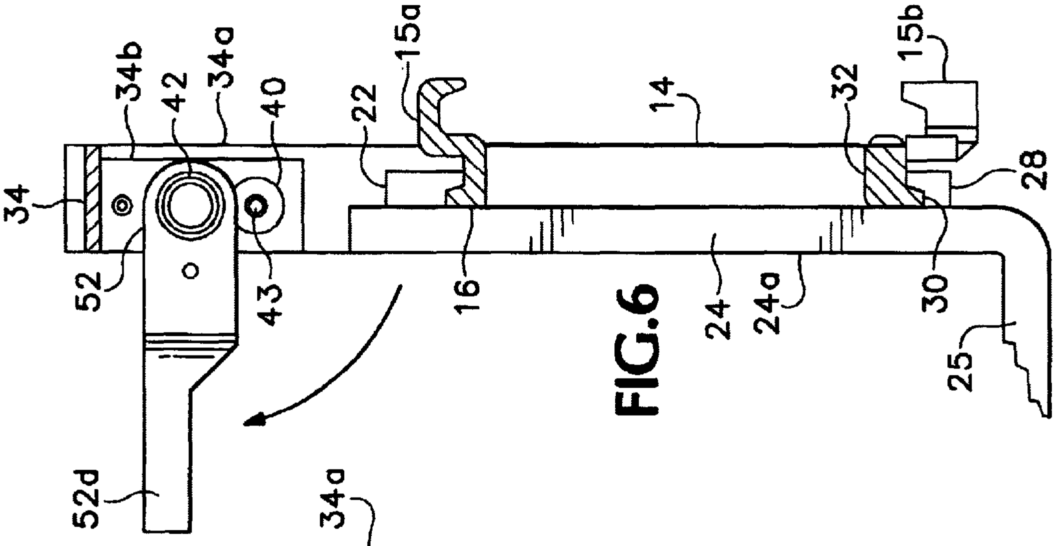
FIG. 6 is a cross-sectional view showing the detached yoke of FIG. 5 in its fork disengaging position.
Figure 5:
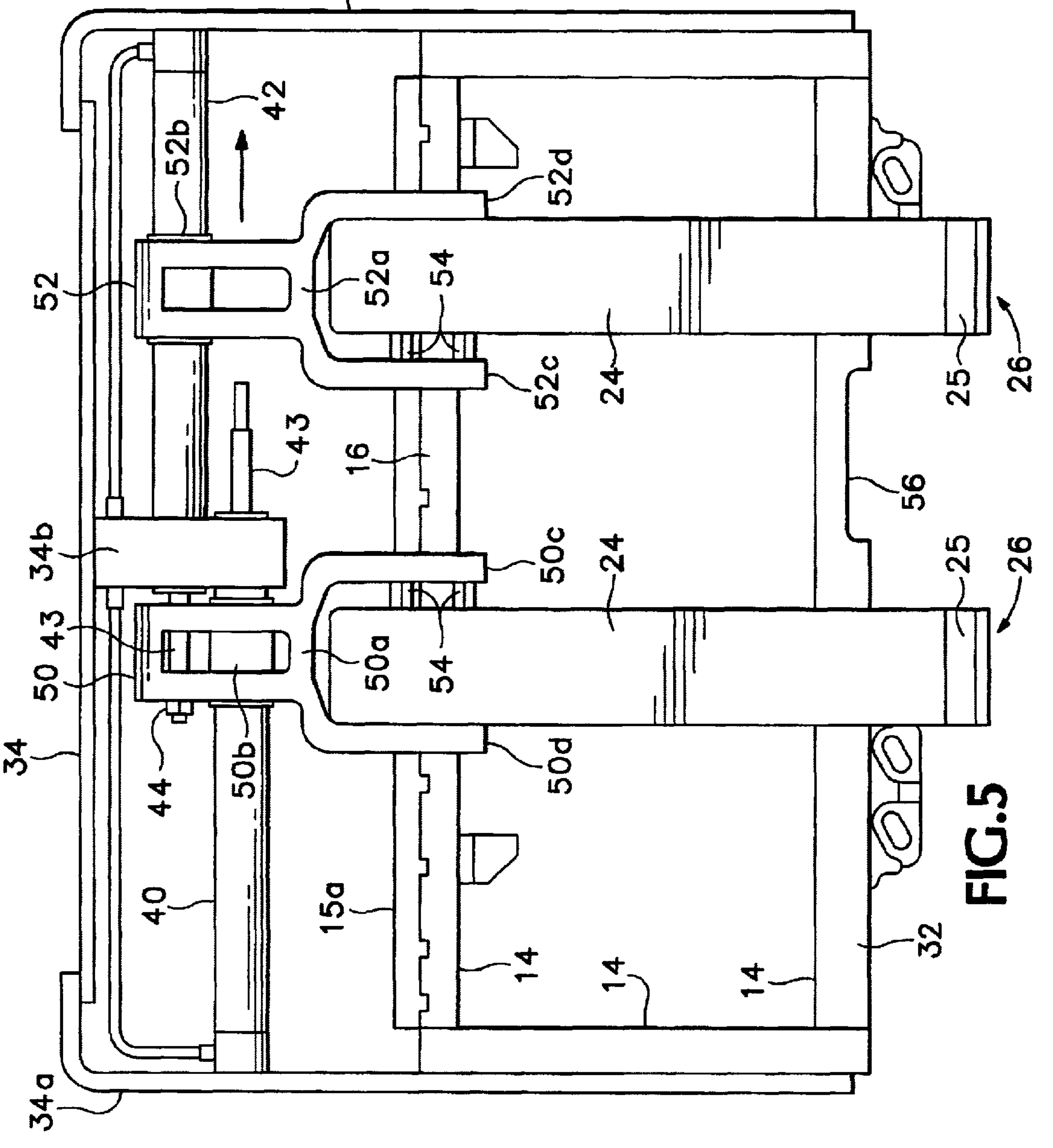
FIG. 5 is a front view of the fork positioner of FIG. 1, with the yoke of FIG. 4 detached from its power actuator and moved away from the actuator preparatory to disengagement from the fork.

When it is desired to remove one of the forks 26 for replacement or repair, it is necessary to lift the fork upwardly off of the fork-supporting member 16 so that the respective hook 22 of the fork is lifted above the lip 20 of the member 16. However the base 50a or 52a of each yoke prevents the fork from being lifted upwardly off of the fork-supporting member 16 when the yoke is in its fork-engaging position. Accordingly, to enable the fork to be lifted off of the fork-supporting member 16, the yoke must first be moved to a fork-disengaging position. As shown with respect to yoke 52 in FIG. 5, this is accomplished by removing the respective threaded nut 44 on the piston rod 43 connected to the yoke 52, and moving the yoke away from the piston rod (or retracting the piston rod from the yoke) so that they are no longer engaged with each other. If necessary, the cap screw adjusters 54 may also be loosened somewhat. Then the yoke 52 is pivoted about the cylinder 42 in a generally forwardly and upwardly direction to a fork-disengaging position as shown in FIG. 6. Thereafter the fork is moved manually along the fork-supporting member 16 into alignment with a conventional detachment slot 56 formed in the bottom fork-mounting member 32 on the carriage 14, so that the hook 28 at the bottom of the fork can be disengaged from the downwardly-protruding lip 30 by pulling the bottom of the fork forwardly. Thereafter the fork can be lifted upwardly off of the fork-supporting member 16 and replaced or repaired.

Although a power actuator assembly consisting of fluid-power cylinders such as 40 and 42 is preferable, other types of power actuator assemblies may alternatively be used in the present invention, such as a screw-type assembly as shown in U.S. Pat. No. 4,902,190 which is incorporated herein by reference. Other alternatives include electrical, rather than fluid-power, actuators.

As alternatives to the above-described pivotal motion of the yokes between their fork-engaging and fork-disengaging positions, other motions are also within the scope of the invention. For example, the motion of the yokes between the two positions could be forwardly and/or upwardly along variously curved or straight paths, utilizing multiple pivots and/or sliding structures.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fork positioner for mounting upon a fork lift truck to selectively move respective forwardly-protruding load-lifting forks transversely along a fork-supporting member and enable said forks to be selectively detached from said member by lifting each fork upwardly off of said member, said fork positioner comprising:

(a) multiple fork-engaging yokes, each having a base from which a pair of transversely-spaced legs depend to detachably engage a respective fork such that the base of the yoke is positioned above an upper portion of the respective fork and the legs of the yoke depend downwardly along transversely-opposite sides of the respective fork;

(b) a power actuator assembly operable to selectively move said yokes transversely, and thereby move said forks transversely along said fork-supporting member to adjust their transverse spacing;

(c) each of said yokes having a fork-engaging position preventing said respective fork from being lifted upwardly off of said fork-supporting member, and a fork-disengaging position permitting said respective fork to be lifted upwardly off of said fork-supporting member, each of said yokes being selectively movable on said fork positioner between said fork-engaging position and said fork-disengaging position; and (d) each of said yokes being movable pivotally forwardly and upwardly from said fork-engaging position toward said fork-disengaging position.

2. A fork positioner for use with a fork lift truck, said fork positioner capable of selectively adjusting a a transverse spacing between respective detachable load-lifting forks and comprising:

(a) multiple yokes, each having a base interconnecting a pair of transversely-spaced legs capable of depending from said base downwardly along transversely-opposite sides of one of said forks;

(b) a power actuator assembly operable to adjust the transverse spacing between said forks by moving said yokes;

(c) each of said yokes having a first position on said fork positioner that prevents a respective fork from being detached from said fork positioner, and a second position on said fork positioner that permits said respective fork to be detached from said fork positioner; and (d) said base of each of said yokes being operably positionable above an upper portion of a respective fork and said legs being capable of depending downwardly along transversely-opposite sides of said respective fork when said yoke is in said first position and incapable of depending downwardly along transversely-opposite sides of said respective fork when said yoke is in said second position.

3. The fork positioner of claim 2 where each of said yokes is selectively movable between said first position and said second position while continuously engaged with said fork positioner.

4. The fork positioner of claim 2 where a transverse spacing between said legs of a respective yoke remains constant while said yoke is moved from said first position to said second position.

5. A fork positioner for use with a fork lift truck, said fork positioner capable of selectively adjusting a transverse spacing between respective detachable load-lifting forks and comprising:

(a) multiple yokes, each having a base interconnecting a pair of transversely-spaced legs capable of depending from said base downwardly along transversely-opposite sides of one of said forks;

(b) a power actuator assembly operable to adjust the transverse spacing between said forks by moving said yokes;

(c) each of said yokes having a first position that prevents a respective fork from being detached from said fork positioner, and a second position that permits said respective fork to be detached from said fork positioner, each of said yokes being selectively movable between said first position and said second position while continuously engaged with said fork positioner; and (d) said base of each of said yokes being operably positionable above an upper portion of a respective fork and said legs being capable of depending downwardly along transversely-opposite sides of said respective fork when said yoke is in said first position and incapable of depending downwardly along transversely-opposite sides of said respective fork when said yoke is in said second position.

6. The fork positioner of claim 5 where a transverse spacing between said legs of a respective yoke remains constant while said yoke is moved from said first position to said second position.

7. A fork positioner for use with a fork lift truck, said fork positioner capable of selectively adjusting a transverse spacing between respective detachable load-lifting forks and comprising:

(a) multiple yokes, each having a base rigidly interconnecting a pair of legs capable of depending from said base downwardly along transversely-opposite sides of one of said forks such that said pair of legs are held in a fixed transverse spacing with respect to each other by said base;

(b) a power actuator assembly operable to adjust the transverse spacing between said forks by moving said yokes; and (c) each said base having a first position that prevents a respective fork from being detached from said fork positioner, and a second position that permits said respective fork to be detached from said fork positioner.

* * * * *